United States Patent Office 3,213,723
Patented Oct. 26, 1965

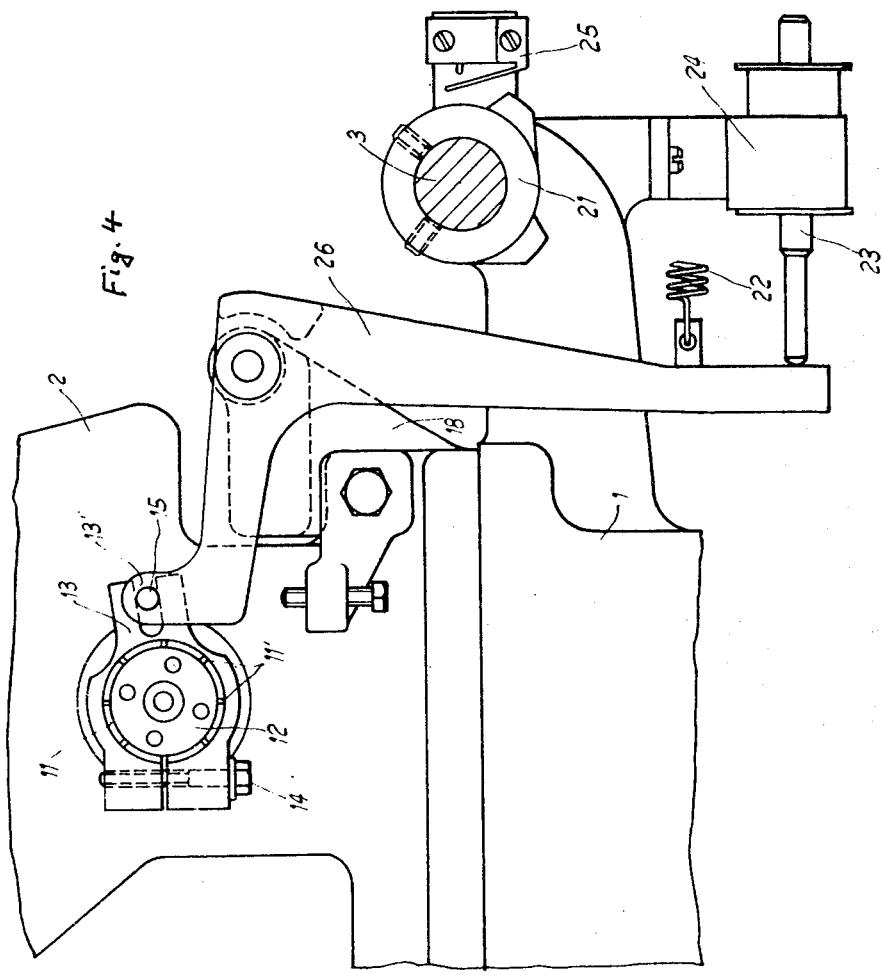

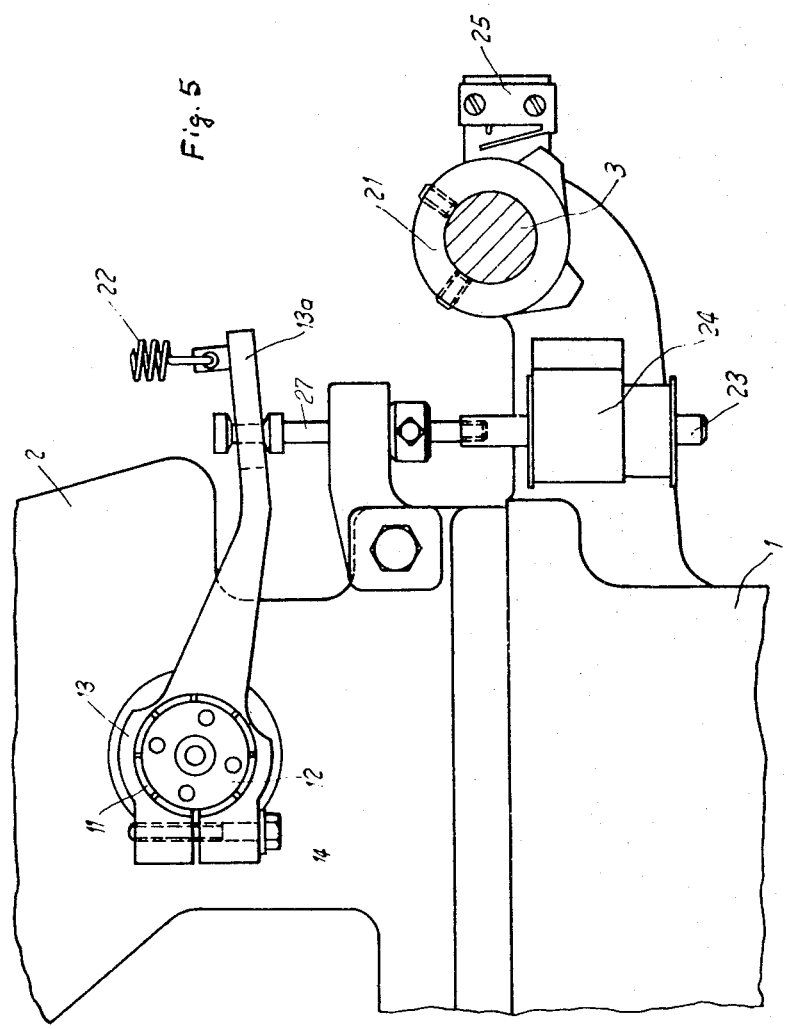

3,213,723
CONTROL DEVICE FOR A STOCK GUIDING
COLLET IN AN AUTOMATIC LATHE
Guillaume-Ernest Mégel, Moutier, Switzerland, assignor to Usines Tornos Fabrique de Machines Moutier S.A., Moutier, Switzerland, a Swiss company
Filed Apr. 4, 1963, Ser. No. 270,704
Claims priority, application Switzerland, Apr. 5, 1962, 4,154/62
9 Claims. (Cl. 82—38)

The U.S. Patent 3,115,800 filed April 11, 1960 describes a guiding device for guiding bar stock which is machined on an automatic lathe having a movable headstock, by means of tools fixed on tool holders controlled by cams fixed on the cam shaft of the said lathe. The said guiding device is secured by a nut in the support for tools in fan formation and comprises a conical sleeve in which is arranged an auxiliary collet with a frusto-conical head provided with a rear nut serving to secure a sleeve in which is mounted a slidable hollow member, the front end of which made in the form of a guide collet, which is capable of being opened and closed, while maintaining a controlled guiding clearance for all time on the bar stock, with each cycle of operations of the tool holders, by a longitudinal movement of the hollow member towards the front and towards the rear.

In that arrangement, the reciprocatory movement of the hollow member is effected by means of a rotatable operator connecting the rear ends of this hollow member and the sleeve serving for the mounting thereof, the said operator being capable of being controlled from a cam fixed on the cam shaft and the action of which is applied against a return spring to a rocker, the oscillatory movement of which is transmitted to the said rotary operator with each cycle of operations of the lathe, corresponding to one revolution of the cam shaft.

The present invention relates to a control device for a stock guiding collet of the aforementioned type, in which the cam fixed on the cam shaft of the lathe does not act directly on the said rocker, the oscillatory movement of which is transmitted to the rotary operator, but indirectly, i.e. by means of an actuating element which is controlled electromagnetically, pneumatically, hydraulically or under combined control.

The accompanying drawing shows by way of example three embodiments of the subject of the invention.

Figure 1:
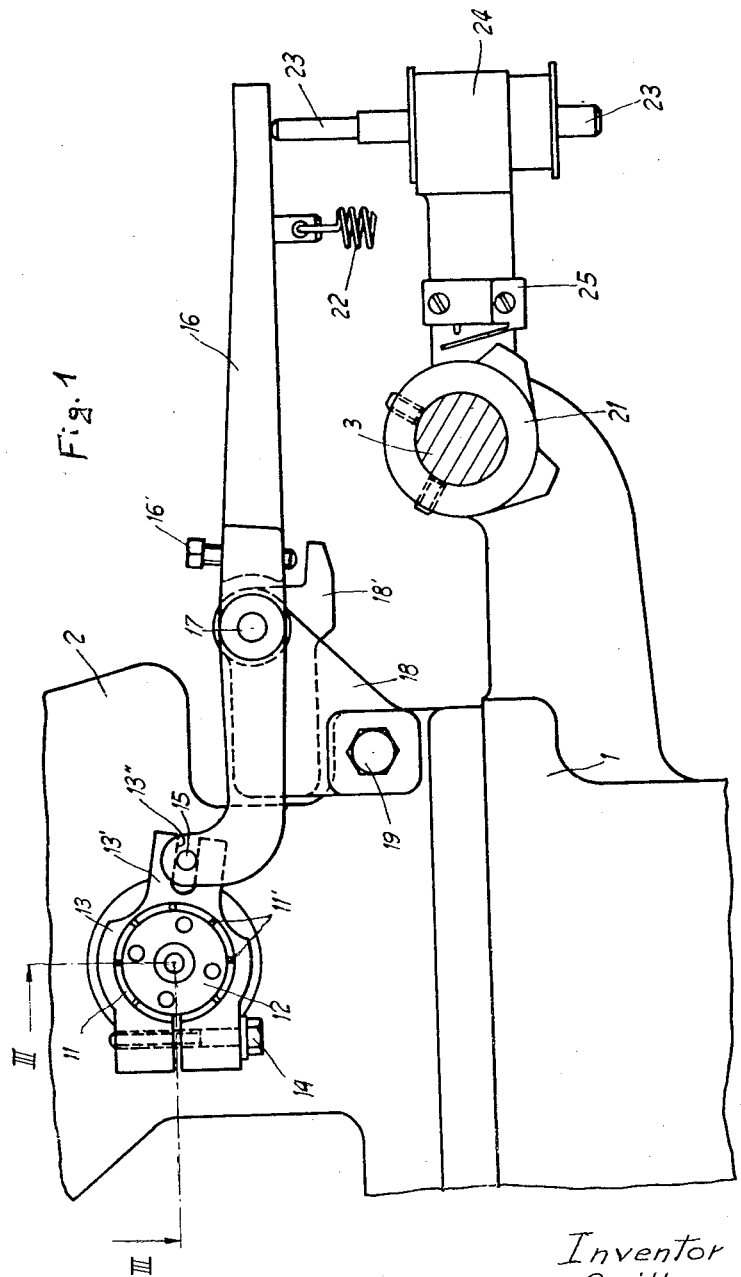
FIG. 1 is a side elevation of the control device according to the first embodiment, this control device being applied to an automatic lathe with a shifting headstock, of which only the parts having a direct bearing on the invention are shown.
Figure 2:
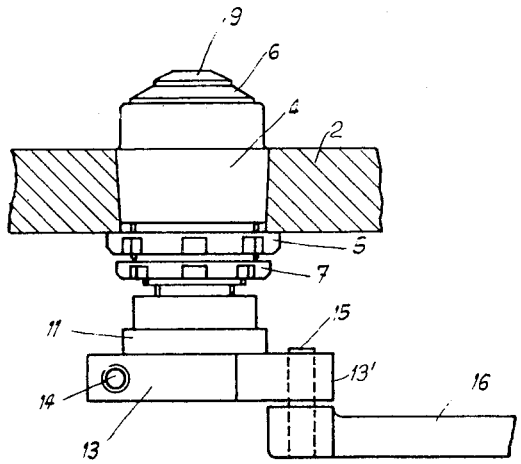
FIG. 2 is a plan view of a part of the device of FIG. 1.

In view of the similarity existing from a constructional point of view between the means according to FIGS. 1 and 2 and the example illustrated in the above stated U.S. patent, the same reference numerals as in the drawing of this patent application are used in the accompanying drawing for various constructional elements. On the other hand, the following description discusses fully only those details which are not apparent from the description of the example shown in the drawing of the above stated U.S. patent. In FIG. 1 the bed of an automatic lathe having a shifting headstock is marked 1 and a support fixed to this bed and on which the tool carriers (not shown) of the lathe are slidably mounted in fan dis-position is marked 2. In the tool carriers are fixed the tools serving for machining the bar which is rotated by means of a collet chuck rotatably journalled in the movable headstock and driven by suitable means. Since the collet chuck and movable headstock in which it is journalled are in themselves not part of the invention, they are not shown in the drawing in order to avoid unnecessary complication.

As mentioned above the movement of the tool holders and the forward movement of the bar stock during the machining periods is effected by cams fixed on a cam shaft marked 3 in FIG. 1. As has already been mentioned, to ensure high precision of machining of the forward end of the bar, the automatic lathe is provided according to the invention with a device for guiding and centering the bar and this device will now be described.

Figure 3:
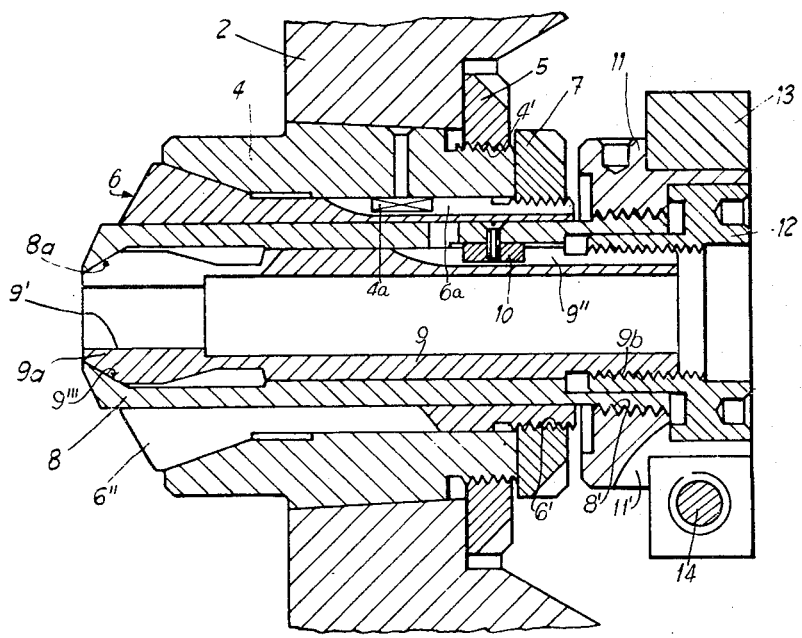
FIG. 3 is a longitudinal section to a larger scale on the line III—III of FIG. 1, and FIGS. 4 and 5 are views similar to FIG. 1, but showing a device according to the second and third embodiments of the invention.

A conical sleeve (FIG. 3) is engaged in a conical bore in the support 2 and has a threaded cylindrical rear portion 4' upon which is threaded a nut 5 bearing against the rear face of the support 2 to secure the conical sleeve 4 firmly in the latter. This sleeve serves as a housing for an auxiliary collet 6 having radial slots 6" extending back from its forward end by which means elastically mounted jaws are formed. The front end of the collet 6 is conical and engages in the forward part of the sleeve 4 which has a corresponding socket. The rear portion 6' of the collet 6 is also threaded and carries a nut 7 which enables this collet to be tightened by drawing it backwards thereby to grip within it a sleeve 8 for which it serves as a seating. This arrangement enables the precise longitudinal position of the sleeve 8 to be adjusted. A longitudinal groove 6a provided in collet 6 and a key 4a secured to sleeve 4 and entering groove 6a prevent collet 6 from rotating within sleeve 4.

The sleeve 8 comprises a front portion provided with a conical internal abutment surface 8a, and a threaded part 8' at the rear. In this sleeve 8 is lodged a slidable hollow member 9 having a front part 9a which forms a guide collet 9' to guide the stock bar (not shown) passing through the hollow member. The front part 9a of member 9 is slotted axially so as to be resilient. The front part 9a is provided with a conical external abutment surface 9''' corresponding to the stop surface 8a of the sleeve 8. Thus, the member 9 is brought to its closed position when it is pushed into the sleeve 8 from the rear end thereof. If desired, the member 9 may be made in two parts, of which the one part, which would form the resilient head 9a, would be screwed on to the rear part, which would then have the form of a socket or holder. This latter construction of the hollow member 9 has the advantage of enabling only the resilient head and not the complete member 9 to be replaced when the diameter of the bar to be machined is changed.

To prevent the hollow member 9 from rotating in relation to the sleeve 8 it has a longitudinal groove 9" in which engages a key 10 fixed to the inside of the sleeve 8. The rear part 9b of the hollow member 9 is threaded and the pitch of this thread is less than i.e. different from that on the rear part 8' of the sleeve 8.

On the threaded part 8' of the sleeve 8 is threaded a hollow member having a threaded part 11 while a cylindrical nut 12 is threaded on the threaded part 9a of the sliding hollow member 9. The cylindrical rear portion of the hollow part 11 is provided with a plurality of radial slots 11' thereby affording it some elasticity. On this cylindrical portion is fitted a slotted ring 13 which can be tightened by means of a bolt 14. The tightening of this ring 13 causes a slight contraction of the rear portion of the hollow part 11 so that the three members 11, 12 and 13 are rigidly secured together to form a combined nut member with two internal threads of different pitches.

The ring 13 also has a radial portion 13' provided with a radial slot 13" in which is engaged a lateral pin 15 (see also FIG. 2) fixed to one end of a rocker 16 pivoted at 17 on a supporting arm 18 fixed to the tool holder support 2 by means of a bolt 19. The rocker 16 is actuated by a sliding rod 23 which is under the control of an electromagnet 24, in the circuit of which is connected a switch 25, which itself is controlled by a cam 21 keyed to the cam shaft 3. Thus, when the switch 25 is brought to the closed position, the rod 23 causes the rocker 16 to rock against the action of the return spring 22. This rocking movement is transmitted to the ring 13 so as to rotate the combined nut member 11, 12, 13 on the two threads on the parts 8', 9b. Since the sleeve 8 is fixed as above mentioned while the hollow member 9 can slide longitudinally within the sleeve 8 and since as above mentioned the threads on the sleeve and on the hollow member are of different pitches the hollower member 9 is displaced rearwardly by an amount which is just sufficient to allow the guide collet 9' to open slightly. From this moment on the stock bar can move freely forward in the guide collet. When the rise of the cam 21 leaves the contact 25, the electromagnet 24 is released and the return spring 22 rocks the rocker 16 in the opposite direction. The combined nut member is thus rotated in the opposite direction and the hollow member 9 now makes a forward movement to restore the guide collet 9' to its guiding position. It will thus be seen that by longitudinal reciprocating movement of the hollow member 9 within the sleeve 8 due to rotation in one direction and the other of the combined nut member 11, 12, 13 itself operated from the cam shaft 3, the guide collet is caused to open and to close again at each rotation of the operating cam 21. Since as above mentioned all the machining operations and the forward feed of the work bar are effected from the cam shaft 3, the synchronization of all these movements including the opening and closing of the guide collet 9' is only a matter of choice of cams and their angular adjustment on the shaft 3.

As may be seen in FIG. 1 the rocker 16 is provided with a stop screw 16' cooperating with a lug 18' integral with the support 18 and enabling the rocking of the rocker 16 when the electromagnet 24 is released to be limited in a regulatable manner. It will also be seen that by loosening the bolt 14 the nut member 11, 12, 13 can be adjusted on the threaded part of the sleeve 8 thereby to adjust very precisely the guiding clearance to be given to the work bar in the guide collet 9'.

In the arrangement according to FIG. 4 the actuating movement of the sliding rod 23 of the electromagnet is transmitted to the combined nut member 11, 12, 13 by means of a cranked lever 26. It is obvious that the use of such a cranked lever involves certain changes in the arrangement of the elements cooperating with the said lever. As these changes are readily apparent from FIG. 4, it has not been considered necessary to discuss these changes in greater detail.

In the arrangements according to FIGS. 1 and 4, the levers 16 and 26 transmit an angular movement to the ring 13 by means of a connection comprising a slot 13' and a pin 15, as in the example of the above stated U.S. patent. Furthermore, it is also possible to make this ring 13 so that it has a lateral lever arm 13a, below which is arranged the sliding rod 23 of the electromagnet, and then to establish a connection by means of an extension 27 of the rod 23 of the electromagnet 24, as shown in FIG. 5. It is thus apparent that also in this case the control of the combined nut member 11, 12 and 13 causing the opening and closing of the head of the guiding and centering hollow member 9 is certainly effected, as in the example of the U.S. Patent No. 3,115,800, from the cam shaft, but by means of the sliding rod of an electromagnet. However, it is evident that these intermediate means could, when required, be replaced by equivalent means of a type which are either pneumatic or hydraulic.

The control device described above constitutes a substantial improvement of the device disclosed in the U.S. Patent No. 3,115,800. Since the power necessitated by the actuation of the stock guiding device is now derived from an electromagnet and not from the camshaft, the latter is not loaded with the device disclosed above as much as with the device disclosed in the U.S. Patent No. 3,115,800. Moreover, the location of cam 21 along shaft 3 can be chosen much more freely than with the mechanical control device disclosed in the U.S. Patent No. 3,115,800. Finally, the insertion of electric, pneumatic or hydraulic power means between the cam and the stock guiding device provides for a smooth control of this device without necessitating the cam to be cut in a shape comprising critical and very precise curves requiring a great amount of skill for their manufacture from the workman attending to the machine.

I claim:

1. In an automatic lathe having a sliding headstock and being controlled by a set of cams secured to a camshaft, the combination of a control device and a stock guiding collet comprising a sleeve fixed relative to the lathe, a hollow member slidable in said sleeve, a guide collet at the forward end of said hollow member for guiding the work bar, cooperating formations in said sleeve and on said collet whereby the collet can be closed into guiding position and opened by longitudinal movement of said hollow member in relation to said sleeves, a rotatable operating member coupled to the rear ends of said sleeve and said hollow member for effecting the longitudinal movement of said hollow member in relation to said sleeve, a motor operated device for actuating said rotatable operating member, a cam actuated control device controlling said motor operated device, a cam on said cam shaft actuating said control device thereby to cause said collet to be opened and closed at the appropriate times during the cycle of machining operations, and stop means limiting the closing action of said guide collet.

2. A control device according to claim 1 wherein said motor operated device includes a power device which when energised causes said collet to be opened and a return spring which causes said collet to be closed when said power device is de-energised.

3. A control device according to claim 2 in which said motor operated device includes a lever coupling said power device to said rotatable operating member, and in which said return spring acts upon said lever.

4. A control device according to claim 1 further comprising a return spring acting to move said rotatable operating member in one direction and said motor operated device comprises a lever coupled to said rotatable operating member and an electromagnet which when energised acts upon said lever thereby to move said energised operating member in the opposite direction to that in which the return spring moves it.

5. A control device according to claim 4 in which one end of said lever has a pin and slot coupling with said rotatable member, and said electromagnet has a sliding core member coupled to the other end of said lever.

6. A control device according to claim 4 in which said rotatable member has an integral lever arm, and said electromagnet has a sliding core member which acts upon the outer end of said lever arm.

7. A control device according to claim 4 in which said control device is an electric switch in the circuit of said electromagnet and directly actuated by said cam.

8. A control device according to claim 1 wherein said guide collet has a forwardly tapering external surface at its forward end and said sleeve has a corresponding internal tapering surface so that said collet is closed by a forward movement in relation to said sleeve.

9. In an automatic lathe having a sliding headstock and being controlled by a set of cams secured to a camshaft and having a stock guiding collet, a control device for the stock guiding collet comprising, in combination, a control cam on the lathe camshaft, an initiating member which is normally in the inactive condition and contacted by said cam and changed to the active condition under the control of said cam, power means connected to said initiating member and operable upon a change of said initiating member from its inactive condition into its active condition, a reciprocable operator adapted for opening and closing the stock guiding collet upon reciprocating said operator, connecting means establishing a mechanical connection between said power means and said operator to cause said operator to be actuated by said power means when the same has been made operable by said initiating member.

References Cited by the Examiner

UNITED STATES PATENTS

| | | |
|---|---|---|
| 2,333,180 | 11/43 | Holmes. |
| 2,417,132 | 3/47 | Schreiber _____ 82—2.5 |
| 2,871,022 | 1/59 | Farnsworth _____ 279—52 X |
| 3,115,800 | 12/63 | Megel et al. _____ 82—38 |

FOREIGN PATENTS 813,046     5/59   Great Britain.

WILLIAM W. DYER, JR., *Primary Examiner.*